United States Patent [19]

Kotler et al.

[11] 4,229,162

[45] Oct. 21, 1980

[54] CLOSURE APPARATUS FOR A SLAB FURNACE AND METHOD OF HEATING SLABS THEREIN

[75] Inventors: Richard G. Kotler; Francis H. Bricmont, both of Pittsburgh, Pa.

[73] Assignee: Washington Steel Corporation, Washington, Pa.

[21] Appl. No.: 9,064

[22] Filed: Feb. 5, 1979

[51] Int. Cl.³ .................... F27D 5/00; F27D 1/18
[52] U.S. Cl. .................... 432/6; 110/173 R; 110/176; 266/253; 432/250
[58] Field of Search ............ 432/250, 6; 110/173 R, 110/173 C, 176, 177; 266/253

[56] References Cited

U.S. PATENT DOCUMENTS

| | | | |
|---|---|---|---|
| 1,336,190 | 4/1920 | Berglof | 110/176 X |
| 1,773,049 | 8/1930 | Lobley | 110/176 |
| 3,836,325 | 9/1974 | Nakamura et al. | 266/253 |
| 4,103,880 | 8/1978 | Western et al. | 266/253 |

Primary Examiner—John J. Camby
Attorney, Agent, or Firm—Reed, Smith, Shaw & McClay

[57] ABSTRACT

Apparatus and method for closing bottom-entry slab furnaces in which a door is pivotably connected to the slab elevator by a horizontally arranged hinge. The door is provided with a cam follower that cooperates with a cam apparatus to controllably swing the door between closed and open positions as the door is moved vertically past the cam apparatus.

9 Claims, 6 Drawing Figures

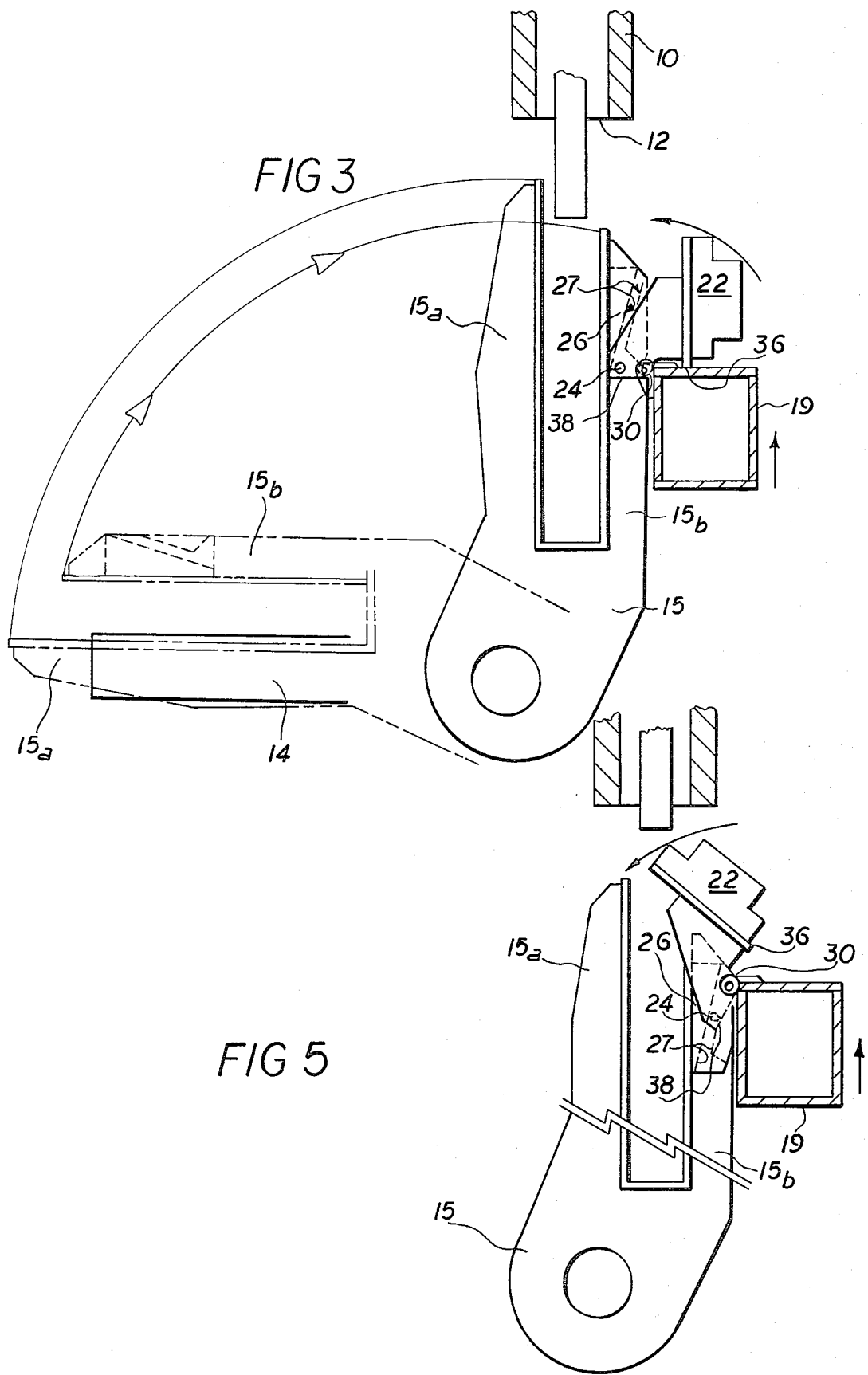

CLOSURE APPARATUS FOR A SLAB FURNACE AND METHOD OF HEATING SLABS THEREIN

BACKGROUND OF THE INVENTION

1 Field of the Invention

The present invention relates to slab furnaces and, more particularly, to induction-type slab reheating furnaces.

2. Description of the Prior Art

Metal slabs are reheated prior to certain shaping or treating operations, such as rolling the slab to a specified shape, or treating the slab to obtain selected properties as in the manufacture of stainless and silicon steel and titanium. The reheating process is typically carried out in a batch-type furnace having a refractory lining wherein the slab is heated to a controlled temperature.

In one type of furnace design, the reheating furnace is provided with a bottom opening receiving the slab. In the prior art, the slab was carried into the furnace by an electrohydraulically controlled slab handling apparatus which gripped the slab between two fingers and then elevated the slab into the furnace.

Early furnaces of this type had no door or other structure to cover the bottom opening or otherwise close the furnace. These furnaces therefore lost heat through this opening by convection and radiation. Consequently, there existed a temperature gradient in the furnace that was sufficiently sharp to cause faults and other defects in the metal that impaired the quality and consistency of the subsequently finished product. Subsequently, these bottom entry furnaces were provided with doors that were connected to the furnace by a horizontally arranged hinge. These doors provided a means of closing the bottom openings of the furnace and thereby retard the loss of heat from the furnace that resulted in the temperature gradient that adversely affected the quality and consistency of the workpiece.

Unfortunately, the doors known in the prior art had several disadvantages. For example, the doors were hinged directly to the furnace and were connected such that they pivoted about an axis that was substantially perpendicular to the longitudinal center axis of the furnace. Consequently, the hinges that formed the connection between the furnace and the door were exposed to the extreme temperatures of the furnace causing them to warp and otherwise deteriorate. Also, the prior doors were controlled by hydraulically activated mechanism that was electrically interlocked with the operation of the furnace charging mechanism but required an additional, independant hydraulic system for the furnace. Consequently, the mechanism for closing the doors added considerable complexity and expense to the installation and maintenance of the furnace.

Accordingly, there existed a need for effectively closing bottom entry slab furnaces such that a more even temperature could be maintained within, and that would have a useful life that was commercially more acceptable than doors known in the prior art. Also, there was a need for doors of a simpler and more dependable design and that were less expensive to install and maintain. Accordingly, there existed a need in the prior art for efficiently closing bottom entry slab furnaces such that a more even temperature could be maintained within.

SUMMARY OF THE INVENTION

In accordance with the present invention, a door is provided for closing a slab reheating furnace such that a substantially even temperature gradient is maintained within the furnace at times when the door is closed, thus improving the quality and consistency of a subsequently finished product. The furnace cooperates with slab handling apparatus that carries the slab to a position vertically below a bottom opening of the furnace, and with an elevator that carries the slab into the furnace through the bottom opening. A cam apparatus is provided adjacent to the vertical travel path of the elevator and a door that is connected to the elevator is provided with a cam follower that cooperates with the cam apparatus to pivot the door about a horizontal axis as the door is moved vertically with respect to the furnace. The door is pivoted such that, when it is at a vertical position between the furnace and the cam apparatus, it is disposed to cover the bottom opening, and, when it is at a vertical position below the cam apparatus it is disposed to avoid the slab handling apparatus.

Other details, objects and advantages of the invention will become apparent as the following description of the presently preferred embodiment proceeds.

BRIEF DESCRIPTION OF THE DRAWINGS

The accompanying drawings show a presently preferred embodiment of the invention in which:

FIG. 3 is a section taken along the lines III—III of FIG. 1 and shows the door assembly for closing the bottom opening of the furnace, with the door shown in the fully open position.

FIG. 5 shows a side view of the furnace door assembly with the door in a partially open position.

PREFERRED EMODIMENT OF THE INVENTION

Figure 1:
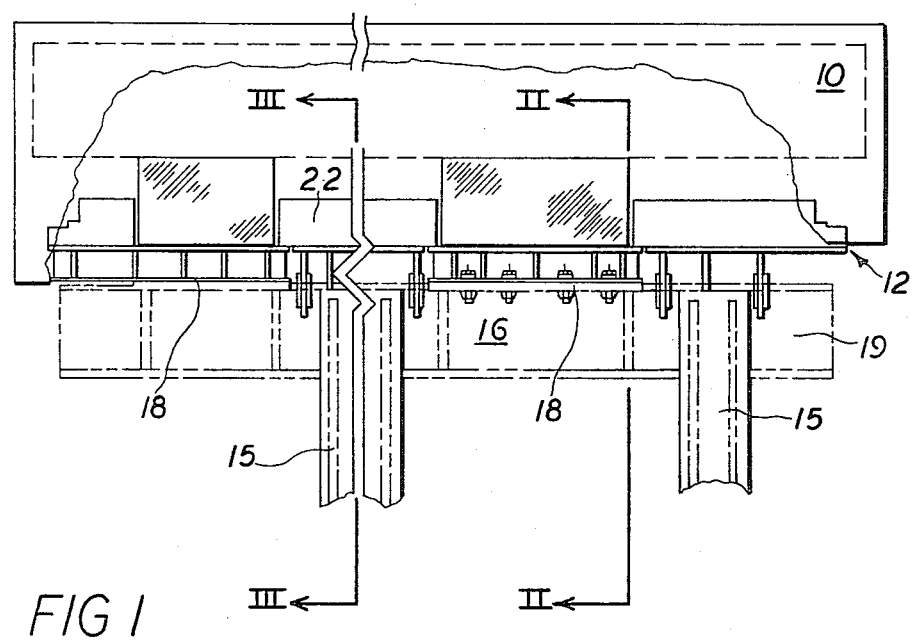
FIG. 1 is an elevation of an induction-type, electric slab furnace together with associated slab handling apparatus and a slab elevator that carries the slab into the furnace through a bottom opening.

The presently preferred embodiment of the invention is included in an electric slab furnace as shown in FIG. 1. The furnace includes a water cooled, refractory lined housing 10 having a bottom opening 12 for receiving the slabs to be heated. Housing 10 further includes an electric coil (not shown) which, when excited by an electric current, inductively heats the slabs placed within the furnace.

Associated with furnace 10 is a roll-out table 14 and a manipulator 15 having a plurality of jaws 15a and 15b. Roll- out table 14 is positioned laterally below furnace 10 and is longitudinally aligned with the bottom opening 12. Manipulator 15 cooperates with roll-out table 14 such that slabs carried on roll-out table 14 are seized between jaws 15a and 15b and the manipulator 15 is rotated such that the slab is elevated from the roll-out table 14 and rotated to a position vertically below furnace 10 for elevation into furnace 10.

Figure 2:
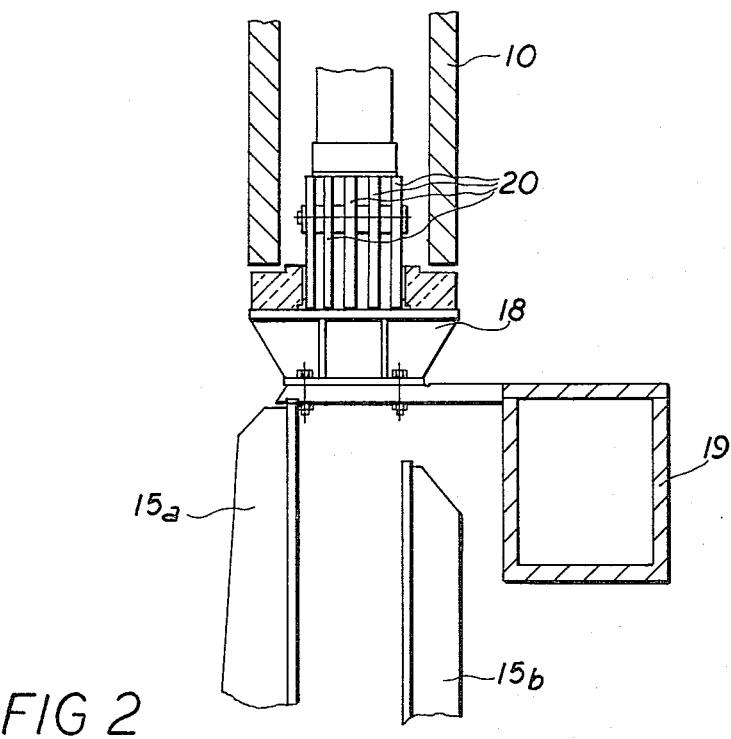
FIG. 2 is a section taken along the lines II—II of FIG. 1 and shows the elevator assembly for taking slabs into and out of the furnace.

As shown in FIGS. 1 and 2, on elevator 16 is provided below manipulator 15 to accomplish the vertical elevation of the slabs from manipulator 15 into the furnace 10. Elevator 16 includes a plurality of slab support heads 18 that are laterally supported from a box beam 19. Vertical movement of box beam 19 is accomplished through rack and pinion gears connected to each end thereof. Slab support heads 18 are further provided with an array of fingers 20 that retard the flow of electric induction currents and the conduction of heat from the slab through the slab support heads 18. The extreme limits of travel of elevator 16 are such that, in the retracted, or lowest, position, the slab support head 18 is below manipulator 15 and, in the extended, or highest, position, the slab support head 18 is partially within the furnace 10. Slab support heads 18, which are connected by a box beam 19, operate synchronously to elevate slabs held by manipulator 15 into furnace 10, to hold the slabs in furnace 10 while they are being heated, and to withdraw the slabs from furnace 10 and replace the heated slabs in manipulator 15.

In accordance with the present invention, a plurality of doors 22 selectively cover bottom opening 12 of furnace 10. Specifically each of doors 22 are provided with a cam follower 24 that cooperates with a cam 26 attached to each of jaws 15b to pivot the door from a generally vertical position when elevators 16 are in the retracted position to a generally horizontal position when elevators 16 are in an extended position. The operation of doors 22 is synchronized with the vertical motion of elevator 16 and box beam 19 such that the doors are in a generally vertical position when the doors are vertically below manipulator 15 to permit the slab to be positioned below the furnace, and are in a generally horizontal position when the slabs are in the furnace to at least partially close bottom opening 12 thereby providing a more uniform heating of the slabs and retarding the loss of heat from the furnace. More specifically, cam 26 is attached to manipulator jaw 15b such that when manipulator jaws 15b are in the vertical position, cam 26 is disposed laterally adjacent the door 22 and is longitudinally aligned with the travel path of elevator 16 such that cam follower 24 and cam 26 cooperate to place the doors in a generally horizontal position at times when they are above the vertical location of cam 26 and to place the doors in a generally vertical position at times when they are below the vertical location of cam 26.

FIGS. 3-6 show the pivotal connection of door 22 to box beam 19 and the arrangement of cam followr 24 and cam 26 which control the pivotal movement of door 22 with respect to box beam 19 in response to the vertical motion of elevators 16. Preferably, door 22 is connected to box beam 19 by hinges 28 and 30 which are connected to door 22 and box beam 19, and which are joined together by self-aligning ball bushing 32 and 34 and hinge pins 33 and 35. As shown in FIGS. 3-65, hinges 28 and 30 are arranged such that door 22 swings about a horizontal axis that is substantially parallel to the longitudinal axis of the furnace. The position of doors 22 with respect to the elevator 16 is controlled by cam follower 24 and cam 26. Cam follower 24 is connected to door 22 and is preferably a cam follower of the type having a roller with a sealed bearing. Also preferably, cam 26 is of the field adjustable type such that the relative position of cam track 27 can be field adjusted with respect to cam follower 24 for each of manipulator jaws 15b.

In a specific example of a typical operation of the furnace 10, a slab is run horizontally across roll-out table 14 such that it is positioned below and laterally adjacent to the bottom opening 12. Typically, the slab is 20 feet (6.1m) long and has cross-sectional dimensions of 6 in. (15cm) by 50 in. (127cm). The slab is disposed such that it is supported lengthwise on the side of its largest cross-sectional dimension and is longitudinally aligned with bottom opening 12. Manipulator 15 is in a substantially horizontal position such that manipulator jaws 15a extend transversely below the slab and jaws 15b extend transversely above the slab. Manipulator 15 is then rotated to a substantially vertical position such that manipulator 15 supports the slab lengthwise on the side of its smallest cross-sectional dimension with the slab maintained between jaws 15a and 15b. Initially elevator 16 is in its retracted position such that the slab support heads 18 are below manipulator jaws 15a and 15b. With elevator 16 in its retraced state, box beam 19 is in a low position and doors 22 are in a substantially vertical plane with the edge 36 of door 22 supported by the upper surface of box beam 19 as shown in FIG. 3. After the slab is brought into position by manipulator 15, elevator 16, which are connected elevates the slab from a first position in manipulator 15 (shown in FIG. 3) to a second position within furnace 10 (shown in FIG. 6) while closing doors 22 as shown in FIGS. 3-6.

Specifically as elevator 16 moves upwardly from its retracted position to its extended position, slab support heads 18 vertically extend toward manipultor 15, engage the slab, and begin to elevate it toward a position inside the furnace. As elevator 16 begins to move upwardly, box beam 19 carrying doors 22 also moves upwardly such that the cam follower 24 connected to each of doors 22 engages the cam track 27 of the respective cam 26 as shown in FIGS. 3 and 5. As elevator 16 and box beam 19 proceed upwardly, doors 22 are pivoted about the horizontal axis of the respective hinges 28 and 30 due to the force exerted between stationary cam 26 and the cam follower 24. Specifically, the dimension between the cam track 27 of cam 26 and box beam 19 gradually diminishes toward the upper extremity of cam 26 such that a force having a substantial horizontal component and having a direction perpendicular to the longitudinal axis of box beam 19 is developed between cam 26 and cam follower 24 as cam follower 24 proceeds upwardly along cam track 27 of cam 26. The sense of this force is such that it cooperates with the forces acting on door 22 at hinges 28 and 30 to develope a horizontal torque on door 22 that counterbalances the weight of door 22 and causes it to rotate toward the horizontal position shown in FIG. 6.

The rotation of the door 22 proceeds as elevators 16 proceeds towards the extended position. However, before elevators 16 reach the extended position, foot portion 38 of door 22 abuts the side of box beams 19 and cam follower 24 becomes disengaged from cam 26 such that doors 22 are supported by cross-member 20 in the substantially horizontal position shown in FIG. 6.

Figure 6:
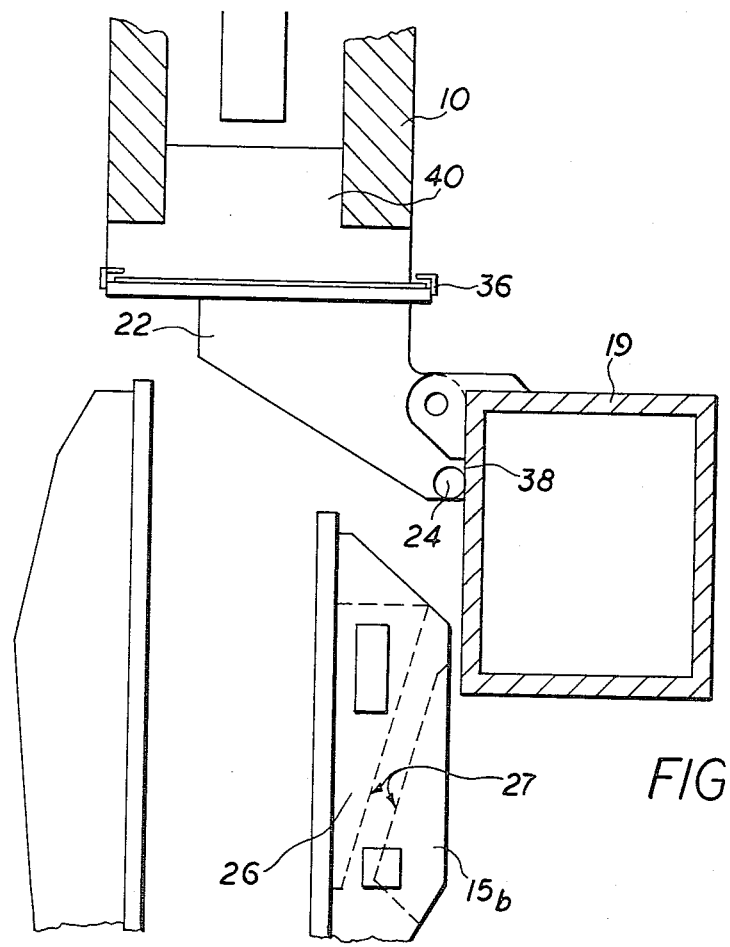
FIG. 6 shows a side view of the furnace door assembly with the door in the fully extended position.
Figure 4:
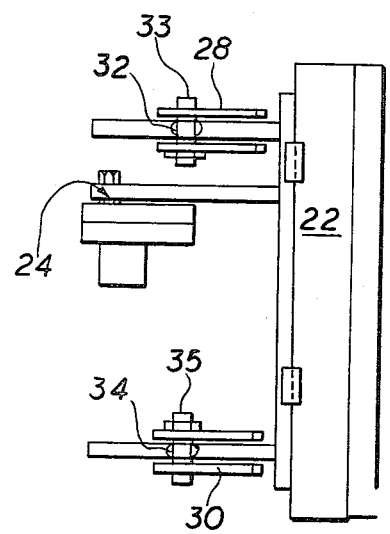
FIG. 4 is a top view of the furnace door assembly showing the pivoting mechanism therefore.

In rotating from the vertical position of FIG. 3 to the horizontal position of FIG. 6, the center of mass of doors 22 passes through the vertical plane containing the horizontal axis of rotation of door 22 such that the gravitational torque exerted on doors 22 changes sense. At about this time, the counterbalancing torque exerted by cam 26 and hinges 28 and 30 also changes sense so that rotation of the doors 22 is controlled throughout its motion from the vertical to horizontal positions. Specifically, the roller of cam follower 24 is horizontally opposed by the opposite side of the cam track 27 of cam 26 such that the sense of the substantially horizontal component of the force between cam 26 and cam follower 24 reverses.

In accordance with the foregoing description, doors 22 are placed in their substantially horizontal position before the extension of elevator 16 is completed to allow the ceramic inner portion 40 of doors 22 to clear furnace 10. With doors 22 in the horizontal position, elevator 16 continues to move toward its fully extended position in which the slab is maintained in furnace 10 on support heads 18 of elevator 16. The location of doors 22 with respect to support heads 18 is such that when elevator 16 is in the fully extended position, doors 22 close the bottom opening of furnace 10 between longitudinal positions of support heads 18 (FIG. 1).

When heating of the slab is completed, doors 22 are opened and the slab is removed from the furnace in substantially the inverse manner described above. That is, elevator 16 is lowered from its extended position to its retracted position and the slab is withdrawn from furnace 10. As the elevator 16 is lowered, doors 22 remain in their horizontal position until the roller of cam follower 24 engages the track 27 of cam 26. As elevator 16 is further lowered, the counter-balancing forces developed between cam 26 and cam follower 24 control the pivoting of doors 22 from the horizontal position shown in FIG. 6 to the vertical position shown in FIG. 3. With doors 22 in the vertical position, the elevator 16 continues to retract and, as the slab support heads 18 are lowered below manipulator 15, the heated slab is deposited between manipulator jaws 15a and 15b of manipulator 15. Manipulator 15 is then rotated from its substantially vertical position to its substantially horizontal position in which the slab is replaced on roll-out table 14. The heated slab is then further processed in accordance with conventional techniques.

Since the doors 22 are hinged to the elevator 16 as opposed to the furnace 10, hinges 28 and 30 are removed from direct and prolonged exposure to the heat from furnace 10. Accordingly, hinges 28 and 30 are less prone to deterioration and warpage and tend to have a longer useful life than hinges in the prior art. This advantage is further improved by the arrangement of hinges 28 and 30 about the pivoted axis that is substantially parallel to the longitudinal axis of the furnace and on a side of doors 22 that remains on one side of the bottom opening throughout the operation of the door. Since the hinges do not cross the bottom opening of the furnace, their exposure to the heat from the furnace is further limited.

Additionally, the mechanical linkage between doors 22 and manipulator 15 through cam 26 and cam follower 24 provides a positive mechanism for pivoting doors 22 between the first and second position in response to the basic operation of the furnace charging appartus. Therefore, the position of the door is controlled without requiring additional hydraulic or other systems, resulting in simpler, more dependable, and less expense operation of the furnace.

While a present preferred embodiment of the invention has been shown and described, it is to be understood that the invention is not limited thereto but can be otherwise variously embodied within the scope of the following claims.

We claim:

1. Apparatus for charging a slab into a furnace having a bottom opening, said charging apparatus comprising:
    a manipulator for horizontally receiving the slab and rotating it between horizontal and vertical positions;
    an elevator located adjacent the manipulator, said elevator traveling between a lower limit below the manipulator and an upper limit above the manipulator to carry the slab between the manipulator and the furnace;
    a door that is pivotally connected to said elevator along a horizontal axis;
    a cam follower that is attached to said door; and
    a cam that is disposed laterally adjacent said door and that engages the cam follower to pivot the door between first and second positions about a horizontal axis as the cam follower travels through the cam apparatus, the first position being such that, as the elevator approaches the upper travel limit, the door covers the bottom opening, and the second position being such that, as the elevator approaches the lower travel limit, the door is pivoted away from manipulator.

2. The charging apparatus of claim 1 wherein the door includes a foot portion that supports the door when it is in the first position.

3. The charging apparatus of claim 2 wherein the door is pivoted about a horizontal axis that is substantially parallel to the longitudinal axis of the furnace.

4. Apparatus for charging a slab into a furnace through a bottom opening, said charging apparatus comprising:
    an elevator for charging the slab into the furnace through the bottom opening thereof, said elevator having a plurality of supports and a cross-member connecting the plurality of supports together;
    a door attached to the elevator between the supports, said door being pivotally connected to the cross-member along a horizontal axis;
    a cam follower attached to the door; and
    a cam disposed laterally adjacent the travel path of said elevator such that the cam engages the cam follower and pivots about a horizontal axis between first and second positions as the cross-member moves vertically along the extent of the cam, the position of the door when the elevator is adjacent the upper limit of travel being such that the door covers the bottom opening of the furnace between the elevator supports.

5. The charging apparatus of claim 4 wherein the cam and cam follower cooperate to pivot the doors into position such that the door covers the bottom opening of the furnace between the supports when the cam follower is vertically above the cam.

6. The charging apparatus of claim 5 wherein the door is pivoted about a horizontal axis that is substantially parallel to the longitudinal axis of the furnace.

7. A method for charging a furnace in which a slab is raised into the furnace through a bottom opening by an elevator traveling between upper and lower limits adjacent a cam apparatus, said bottom opening being covered by a door hinged about a horizontal axis and having a cam follower attached thereto, said method comprising:
    positioning the cam apparatus laterally adjacent the elevator doors when the elevator is adjacent its lower limit of travel;

raising the elevator from adjacent its lower limit toward its upper limit to engage the cam and the cam follower and pivot the door to a position in which the door substantially covers the bottom opening of the furnace when the elevator is adjacent the upper limit of travel; and lowering the elevator from adjacent its upper limit toward its lower limit to engage the cam and cam follower and pivot the door in a direction away from the cam.

8. A method for charging a bottom entry furnace that receives a slab through a bottom opening selectively covered by a door having a cam follower that cooperates with a respective cam, said door being connected to an elevator by a horizontal hinge, said method comprising:

positioning the slab in vertical alignment with the bottom opening of the furnace, the elevator being adjacent its lower limit of travel and the doors being in a position such that the cam follower is vertically below the cam;

raising the elevator from adjacent its lower limit to a position adjacent its upper limit to raise the slab into the furnace and engage the cams with the cam follower such that the doors are pivoted to a position in which they cooperate with the elevator to substantially cover the bottom opening of the furnace; and lowering the elevator from a position adjacent its upper limit to a position adjacent its lower limit to remove the slab from the furnace and to engage the cam apparatus with the cam follower to pivot the door to the position in which the cam follower is vertically below the cam.

9. The charging method of claims 7 or 8 wherein the door is pivoted about a horizontal axis that is substantially parallel to the longitudinal axis of the furnace.

* * * * *